United States Patent
Ode

(10) Patent No.: US 8,091,291 B2
(45) Date of Patent: Jan. 10, 2012

(54) STRUCTURE USED AS GREENHOUSE ROOF FRAME, GREENHOUSE ROOF FRAME, GREENHOUSE FRAMEWORK, GREENHOUSE, AND GREENHOUSE FRAMEWORK BUILDING METHOD

(76) Inventor: Takehisa Ode, Tokyo (JP)

( * ) Notice: Subject to any disclaimer, the term of this patent is extended or adjusted under 35 U.S.C. 154(b) by 546 days.

(21) Appl. No.: 10/595,972

(22) PCT Filed: Dec. 15, 2004

(86) PCT No.: PCT/JP2004/018704
§ 371 (c)(1),
(2), (4) Date: Nov. 6, 2008

(87) PCT Pub. No.: WO2005/058015
PCT Pub. Date: Jun. 30, 2005

(65) Prior Publication Data
US 2009/0071091 A1 Mar. 19, 2009

(30) Foreign Application Priority Data
Dec. 18, 2003 (JP) .................................. 2003-421533

(51) Int. Cl.
*E04B 7/06* (2006.01)
(52) U.S. Cl. ........... 52/93.1; 52/90.1; 52/643; 52/653.1; 52/745.06
(58) Field of Classification Search ................ 52/653.1, 52/90.1, 93.1, 646, 698, 703, 639, 643, 263, 52/22, 92.1, 92.3, 745.06, DIG. 17
See application file for complete search history.

(56) References Cited

U.S. PATENT DOCUMENTS

| | | | | |
|---|---|---|---|---|
| 2,541,784 A * | 2/1951 | Shannon | .......................... | 52/92.2 |
| 2,943,366 A * | 7/1960 | Sanford | ............................ | 52/73 |
| 3,694,987 A * | 10/1972 | Henggeler et al. | ........... | 52/654.1 |
| 3,785,108 A * | 1/1974 | Satchell | .......................... | 52/645 |
| 3,902,280 A * | 9/1975 | Spoar et al. | .................... | 52/91.1 |
| 4,187,652 A * | 2/1980 | Bobrovnikov et al. | ........ | 52/90.1 |
| 4,342,177 A * | 8/1982 | Smith | ............................ | 52/93.1 |
| 4,685,258 A * | 8/1987 | Av-Zuk | ......................... | 52/126.6 |
| 4,878,323 A * | 11/1989 | Nelson | .......................... | 52/92.2 |
| 5,048,242 A * | 9/1991 | Cline | ............................ | 52/126.6 |
| 5,457,927 A * | 10/1995 | Pellock et al. | .................. | 52/633 |
| 5,528,875 A * | 6/1996 | Ziegler et al. | .................. | 52/702 |
| 5,577,353 A * | 11/1996 | Simpson | ........................ | 52/92.2 |
| 5,904,009 A * | 5/1999 | Huang | .......................... | 52/126.6 |
| 5,946,867 A * | 9/1999 | Snider et al. | .................. | 52/167.1 |
| 6,006,485 A * | 12/1999 | Hobbs et al. | ................. | 52/489.1 |

(Continued)

FOREIGN PATENT DOCUMENTS
JP 62-74220 4/1987
(Continued)

*Primary Examiner* — Eileen D Lillis
*Assistant Examiner* — Alp Akbasli
(74) *Attorney, Agent, or Firm* — Cozen O'Connor

(57) ABSTRACT

There is provided a structure which can reduce the lifting workload and the building workload at a high place.
A structure 1 of the invention includes a rectangular frame 11 arranged horizontally, a rectangular main beam 12 arranged vertically on the frame 11, and a principal rafter 13 supporting the main beam 12 and can be built on the ground. The structure 1 is used as a greenhouse roof frame. The lifting workload and the building workload for building a greenhouse roof frame, a framework of the entire greenhouse and a greenhouse, can be greatly reduced as compared with those of the prior art.

16 Claims, 6 Drawing Sheets

U.S. PATENT DOCUMENTS

| | | | | |
|---|---|---|---|---|
| 6,044,593 A | * | 4/2000 | Puls | 52/74 |
| 6,260,327 B1 | * | 7/2001 | Pellock | 52/643 |
| 6,427,400 B1 | * | 8/2002 | Greenblatt | 52/220.5 |
| 6,470,632 B1 | * | 10/2002 | Smith | 52/92.2 |
| 6,758,014 B2 | * | 7/2004 | Chen | 52/63 |
| 7,513,085 B2 | * | 4/2009 | Moody et al. | 52/639 |
| 2002/0020133 A1 | * | 2/2002 | Embury | 52/634 |
| 2003/0009955 A1 | * | 1/2003 | Sellers | 52/90.1 |
| 2003/0159369 A1 | * | 8/2003 | Hoehn | 52/82 |
| 2004/0003536 A1 | * | 1/2004 | Stefan | 47/17 |
| 2004/0060588 A1 | * | 4/2004 | Lekhtman | 135/98 |
| 2004/0172911 A1 | * | 9/2004 | Tadich | 52/633 |
| 2005/0229528 A1 | * | 10/2005 | Kardosz et al. | 52/639 |
| 2005/0235589 A1 | * | 10/2005 | Jakob-Bamberg et al. | 52/263 |
| 2006/0059794 A1 | * | 3/2006 | Gilstrap et al. | 52/90.1 |
| 2006/0174551 A1 | * | 8/2006 | Bartels et al. | 52/90.1 |

FOREIGN PATENT DOCUMENTS

| | | |
|---|---|---|
| JP | 64-37857 | 3/1989 |
| JP | 2002-291348 | 10/2002 |

* cited by examiner

STRUCTURE USED AS GREENHOUSE ROOF FRAME, GREENHOUSE ROOF FRAME, GREENHOUSE FRAMEWORK, GREENHOUSE, AND GREENHOUSE FRAMEWORK BUILDING METHOD

TECHNICAL FIELD

The present invention relates to a structure used as a greenhouse roof frame, a greenhouse roof frame, a greenhouse framework, a greenhouse, and a greenhouse framework building method, which use the structure.

BACKGROUND ART

There has been known a greenhouse framework having a pillar erected on a foundation, a principal rafter rigidly joined to the upper end of the pillar, a ridge beam supported on the principal rafter, and a purlin fixed onto the principal rafter in parallel with the ridge beam.

A roof frame constructing such greenhouse framework has the principal rafter, ridge beam, and purlin. Typically, each of these members is carried to the top of the pillar erected on the foundation using a crane to be built.

The lifting workload for carrying these members to a high place is significantly large. Building at a high place requires a high technique for an operator and is greatly inefficient and dangerous as compared with building it on the ground. The principal rafter needs to be rigidly joined to the pillar using a large number of bolts. There are numerous joints in building the roof frame. Considerable time and effort are required and the building cost is high.

There has been a conventional greenhouse framework called Dutch Light type. Such greenhouse framework is formed in such a manner that a girder is rigidly joined between pillars erected in the width direction to build a roof frame having a ridge beam, a purlin, and a rafter between girders in parallel in the depth direction.

In such greenhouse framework, the strength of the roof frame is insufficient to a lifting load acting on the roof surface when a strong wind blows so that the roof frame can be easily destroyed. In addition, in such greenhouse framework, each member constructing the roof frame is carried to the top of the pillar erected on a foundation using a crane to be built. The lifting workload is significantly large. The building requires a skilled operator. Building at a high place is inefficient and dangerous for even the skilled operator. There are numerous joints in building the roof frame. Considerable time and effort are required and the building cost is high. Further, in such greenhouse framework, a vertical load acting on the roof is concentrated onto the purlin bridged between the girders. The space between the pillars in the depth direction is limited to be small.

In view of the problem of greenhouse building that many kinds of members are carried to a constructing site to be built, there has been proposed that the length and shape of members necessary for greenhouse building such as a pillar, a beam, a ridge beam, and a rafter are designed in modules (for instance, see Japanese Patent Application Laid-Open No. 2002-291348).

In the greenhouse framework construction itself as conventional, when the length and shape of the pillar, the beam, and the like are designed in modules to build a roof frame, each of these members need to be lifted to a high place to be built there. The building requires a skilled operator. The building at a high place is inefficient and dangerous for even the skilled operator. There are numerous joints in building the roof frame. Considerable working time is required and the building cost is high.

Patent Document 1: JP, 2002-291348, A

DISCLOSURE OF INVENTION

Problem to be Solved by the Invention

The present invention has been made in view of the above circumstances and an object of the invention is to provide a structure which can greatly reduce the lifting workload and the building workload at a high place, a greenhouse roof frame, a greenhouse framework, a greenhouse, and a greenhouse framework building method, which use the structure.

Another object of the invention is to provide a structure capable of holding a predetermined strength without needing to be rigidly joined in building a greenhouse framework, a greenhouse roof frame, a greenhouse framework, a greenhouse, and a greenhouse framework building method, which use the structure.

Means for Solving Problem

To solve the above problems, the invention provides the following structure, greenhouse roof frame, greenhouse framework, greenhouse, and greenhouse framework building method.

(1) A structure used as a greenhouse roof frame including a rectangular frame arranged horizontally, a rectangular main beam arranged vertically on the frame, and a principal rafter for supporting the main beam.

(2) The structure according to the (1), wherein the structure is set on a support part of a greenhouse including pillars in such a manner that four corners of the frame are pinned respectively to the pillars.

(3) The structure according to the (1) or (2), further including a secondary member such as a covering material of the greenhouse and a supporting member of the covering material.

(4) A greenhouse roof frame, wherein plural structures each including a rectangular frame arranged, horizontally, a rectangular main beam arranged vertically on the frame, and a principal rafter supporting the main beam are set to be adjacent to each other.

(5) The greenhouse roof frame according to the (4), wherein each of the structures is set on a support part of a greenhouse including pillars in such a manner that four corners of the frame constructing the structure are pinned respectively to the pillars.

(6) The greenhouse roof frame according to the (5), wherein the structures adjacent to each other are set on the support part in such a manner that corner portions of the frames constructing the structures are gathered on a plate provided on the top of each of the pillars to be pinned.

(7) A greenhouse framework, wherein plural structures each including a rectangular frame arranged horizontally, a rectangular main beam arranged vertically on the frame, and a principal rafter supporting the main beam are set on a pillar constructing a support part of a greenhouse to be adjacent to each other.

(8) The greenhouse framework according to the (7), wherein each of the structures is set on the support part in such a manner that four corners of the frame constructing the structure are pinned respectively to the pillars.

(9) The greenhouse framework according to the (8), wherein the structures adjacent to each other are set on the support part in such a manner that corner portions of the frames constructing the structures are gathered on a plate provided on the top of each of the pillars to be pinned.

(10) A greenhouse including a roof frame supported by a support part in such a manner that plural structures each including a rectangular frame arranged horizontally, a rectangular main beam arranged vertically on the frame, and a principal rafter supporting the main beam are set to be adjacent to each other.

(11) The greenhouse according to the (10), wherein each of the structures constructing the roof frame is set on the support part in such a manner that four corners of the frame constructing the structure are pinned respectively to the pillars constructing the support part.

(12) The greenhouse according to the (11), wherein the structures adjacent each other and constructing the roof frame are set on the support part in such a manner that corner portions of the frames constructing the structures are gathered on a plate provided on the top of each of the pillars to be pinned.

(13) A greenhouse framework building method including the steps of: a) building a structure including a rectangular frame arranged horizontally, a rectangular main beam arranged vertically on the frame, and a principal rafter supporting the main beam; and b) setting plural structures built by the a) step on a pillar constructing a support part of a greenhouse to be adjacent to each other.

(14) The greenhouse framework building method according to the (13), wherein in the b) step, each structure built by the a) step is set on the support part in such a manner that four corners of the frame constructing the structure are pinned respectively to the pillars.

(15) The greenhouse framework building method according to the (14), wherein in the b) step, structures adjacent each other and built by the a) step are set on the support part in such a manner that corner portions of the frames constructing the structures are gathered on a plate provided on the top of each of the pillars to be pinned.

(16) The greenhouse framework building method according to any one of the (13) to (15), wherein the structure built by the a) step includes a secondary member such as a covering material of the greenhouse and a supporting member of the covering material.

Effect of the Invention

In the present invention according to the (1), a structure includes a rectangular frame arranged horizontally, a rectangular main beam arranged vertically on the frame, and a principal rafter supporting the main beam. Accordingly, the structure can be built as a single structure independently of the support part of the greenhouse. The structure is used as a greenhouse roof frame to greatly reduce the lifting workload and the building workload at a high place. In addition, the structure has the main beam. Unlike the prior art framework, a girder need not be provided between the pillars erected inside the width direction.

In the invention according to the (2), the structure is set on a support part of a greenhouse including pillars in such a manner that four corners of the frame are pinned respectively to the pillars. The building workload at a high place can be greatly reduced. In addition, the main beam can increase strength to a vertical load. Further, the frame can distribute and transmit a vertical load and a horizontal load to the pillars joined to four corners thereof. It is possible to build a greenhouse framework capable of holding a predetermined strength without being rigidly joined unlike the prior art. The structure has the main beam. The space between the pillars erected in the depth direction can be made larger than that of the prior art.

In the invention according to the (3), the structure further includes a secondary member such as, a covering material of the greenhouse and a supporting member of the covering material. The lifting workload and the building workload at a high place can be greatly reduced.

In the invention according to the (4), plural structures each including a rectangular frame arranged horizontally, a rectangular main beam arranged vertically on the frame, and a principal rafter supporting the main beam are set to be adjacent to each other. The lifting workload for building the roof frame and the building workload at a high place can be greatly reduced. According to the roof frame, a girder need not be provided between the pillars erected in the width direction.

In the invention according to the (5), each of the structures is set on a support part of a greenhouse including pillars in such a manner that four corners of the frame constructing the structure are pinned respectively to the pillars. The building workload at a high place can be greatly reduced. According to the roof frame, it is possible to build a greenhouse framework capable of holding a predetermined strength without being rigidly joined unlike the prior art. The space between the pillars erected in the depth direction can be made larger than that of the prior art.

In the invention according to the (6), the structures adjacent to each other are set on the support part in such a manner that corner portions of the frames constructing the structures are gathered on a plate provided on the top of each of the pillars to be pinned. A high technique is unnecessary for building the roof frame. Even an unskilled operator can easily build the roof frame. The respective structures are integrated via the plate. A structural surface having a bearing strength against a horizontal load can be formed on the pillar. The pillars erected in the greenhouse are joined to the structural surface. The bearing strength against the horizontal load can be exhibited without providing braces (vertical braces) between the pillars adjacent to each other in the width direction or in the depth direction. It is possible to easily realize arrangement of the structural surface having the vertical braces transmitting the horizontal load to the foundations in outer periphery parts (gable surface and side surface) not interfering with the use of the greenhouse. The pillars are joined by the frames of the structures. The plumbing adjustment operation using the vertical braces and braces (horizontal braces) diagonally connecting the pillars to correct distortion of the support part can be unnecessary.

In the invention according to the (7), plural structures each including a rectangular frame arranged horizontally, a rectangular main beam arranged vertically on the frame, and a principal rafter supporting the main beam are set on a pillar constructing a support part of a greenhouse to be adjacent to each other. The lifting workload for building the greenhouse framework and the building workload at a high place can be greatly reduced. According to the framework, a girder need not be provided between the pillars, erected in the width direction.

In the invention according to the (8), each of the structures is set on the support part in such a manner that four corners of the frame constructing the structure are pinned respectively to the pillars. The building workload at a high place can be greatly reduced. The framework can hold a predetermined strength without being rigidly joined unlike the prior art. The space between the pillars erected in the depth direction can be made larger than that of the prior art.

In the invention according to the (9), the structures adjacent to each other are set on the support part in such a manner that corner portions of the frames constructing the structures are gathered on a plate provided on the top of each of the pillars to be pinned. A high technique is unnecessary for building the framework. Even an unskilled operator can easily build the framework. The respective structures are integrated via the plate. A structural surface having a bearing strength against a horizontal load can be formed on the pillar. The pillars erected in the greenhouse are joined to the structural surface. The bearing strength against the horizontal load can be exhibited without providing braces (vertical braces) between the pillars adjacent to each other in the width direction or in the depth direction. It is possible to easily realize arrangement of the structural surface having the vertical braces transmitting the horizontal load to the foundations in outer periphery parts (gable surface and side surface) not interfering with the use of the greenhouse. The pillars are joined by the frames of the structures. The plumbing adjustment operation using the vertical braces and braces (horizontal braces) diagonally connecting the pillars to correct distortion of the support part can be unnecessary.

In the invention according to the (10), a greenhouse includes a roof frame supported by a support part in such a manner that plural structures each including a rectangular frame arranged horizontally, a rectangular main beam arranged vertically on the frame, and a principal rafter supporting the main beam are set to be adjacent to each other. The lifting workload for building the greenhouse framework and the building workload at a high place can be greatly reduced. According to the greenhouse, a girder need not be provided between the pillars erected in the width direction.

In the invention according to the (11), each of the structures constructing the roof frame is set on the support part in such a manner that four corners of the frame constructing the structure are pinned respectively to the pillars constructing the support part. The building workload at a high place can be greatly reduced. The greenhouse can hold a predetermined strength without being rigidly joined unlike the prior art. The space between the pillars erected in the depth direction can be made larger than that of the prior art.

In the invention according to the (12), the structures adjacent each other and constructing the roof frame are set on the support part in such a manner that corner portions of the frames constructing the structures are gathered on a plate provided on the top of each of the pillars to be pinned. A high technique is unnecessary for building the greenhouse framework. Even an unskilled operator can easily build the framework. The respective structures are integrated via the plate. A structural surface having a bearing strength against a horizontal load can be formed on the pillar. The pillars erected in the greenhouse are joined to the structural surface. The bearing strength against the horizontal load can be exhibited without providing braces (vertical braces) between the pillars adjacent to each other in the width direction or in the depth direction. It is possible to easily realize arrangement of the structural surface having the vertical braces transmitting the horizontal load to the foundations in outer periphery parts (gable surface and side surface) not interfering with the use of the greenhouse. The pillars are joined by the frames of the structures. The plumbing adjustment operation using the vertical braces and braces (horizontal braces) diagonally connecting the pillars to correct distortion of the support part can be unnecessary.

In the invention according to the (13), a greenhouse framework building method including the steps of: a) building a structure including a rectangular frame arranged horizontally, a rectangular main beam arranged vertically on the frame, and a principal rafter supporting the main beam; and b) setting plural structures built by the a) step on a pillar constructing a support part of a greenhouse to be adjacent to each other. The lifting workload for building the greenhouse framework and the building workload at a high place can be greatly reduced. The method for building the structure to set it on the support part is employed. The structure itself need not be built at a high place and then can be built on the ground or the like very efficiently in a short time with no effort. As the results, the entire greenhouse framework can be built in a very short time.

In the invention according to the (14), in the b) step, each structure built by the a) step is set on the support part in such a manner that four corners of the frame constructing the structure are pinned respectively to the pillars. The building workload at a high place can be greatly reduced. The method can build the greenhouse framework capable of holding a predetermined strength without being rigidly joined unlike the prior art.

In the invention according to the (15), in the b) step, structures adjacent each other and built by the a) step are set on the support part in such a manner that corner portions of the frames constructing the structures are gathered on a plate provided on the top of each of the pillars to be pinned. A high technique is unnecessary for building the greenhouse framework. Even an unskilled operator can easily build the framework. The respective structures are integrated via the plate. A structural surface having a bearing strength against a horizontal load can be formed on the pillar. The pillars erected in the greenhouse are joined to the structural surface. The bearing strength against the horizontal load can be exhibited without providing braces (vertical braces) between the pillars adjacent to each other in the width direction or in the depth direction. It is possible to easily realize arrangement of the structural surface having the vertical braces transmitting the horizontal load to the foundations in outer periphery parts (gable surface and side surface) not interfering with the use of the greenhouse. The pillars are joined by the frames of the structures. The plumbing adjustment operation using the vertical braces and braces (horizontal braces) diagonally connecting the pillars to correct distortion of the support part can be unnecessary.

In the invention according to the (16), the structure built by the a) step includes a secondary member such as a covering material of the greenhouse and a supporting member of the covering material. The secondary member need not be built at a high place. The secondary member thus can be built on the ground. A the results, the entire greenhouse can be built in a very short time.

Figure 1:
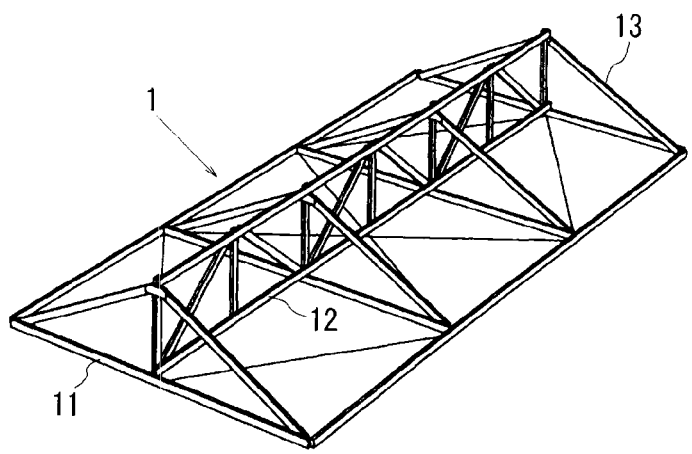
FIG. 1 is a perspective view showing a structure according to an embodiment of the present invention.

DESCRIPTION OF NOTATIONS 1 structure
11 frame
11a, 11b end beam
11c, 11d string beam
11e, 11f intermediate beam
11g brace
12 main beam
12a, 12b chord
12c, 12d end vertical member
12e vertical member
12f diagonal member
13 principal rafter
14 supporting member
2 support part
21 pillar
22 brace
23 stud
24 plate
25 tie rod
3 foundation
4 crane
5 bolt

BEST MODE FOR CARRYING OUT THE INVENTION

Embodiments of the present invention will be described below according to examples shown in the drawings.

Embodiments

FIG. 1 is a perspective view showing a structure according to an embodiment of the invention. As shown in this diagram, a structure 1 according to this embodiment has a frame 11, a main beam 12, and a principal rafter 13.

Figure 2:
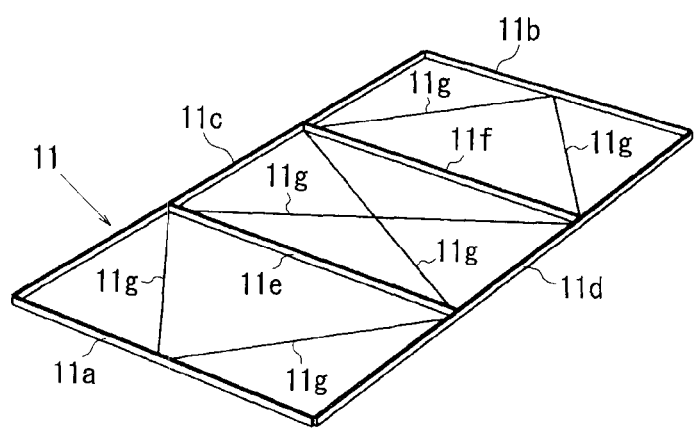
FIG. 2 is a perspective view showing a frame.

As shown in FIG. 2, the frame 11 is formed in a rectangular shape by a pair of end beams 11a and 11b arranged in parallel with each other, and a pair of string beams 11c and 11d arranged to be orthogonal to the end beams 11a and 11b. The frame 11 also has in its inside intermediate beams 11e and 11f bridged between the string beams 11c and 11d, and braces 11g disposed in a space surrounded by the intermediate beams 11e and 11f, the end beams 11a and 11b, and the string beams 11c and 11d. Various forms of arrangement of the intermediate beams 11e and 11f and the braces 11g can be contemplated and can be appropriately set in view of holding the strength.

Figure 3:
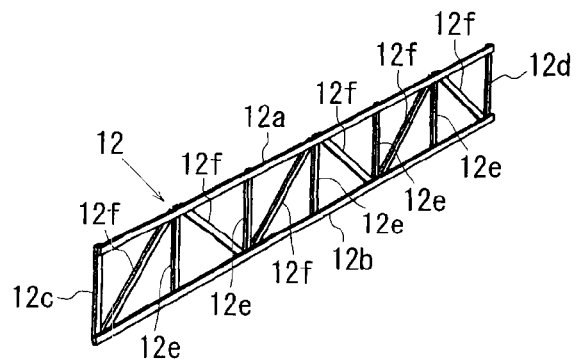
FIG. 3 is a perspective view showing a main beam.

As shown in FIG. 3, the main beam 12 is formed in a rectangular shape by chords 12a and 12b arranged in parallel at the upper and lower sides, and end vertical members 12c and 12d provided between both ends of the chords 12a and 12b. The main beam 12 also has vertical members 12e bridged between the chords 12a and 12b, and diagonal members 12f disposed in a space surrounded by the vertical members 12e, the chords 12a and 12b, and the end vertical members 12c and 12d.

Figure 4:
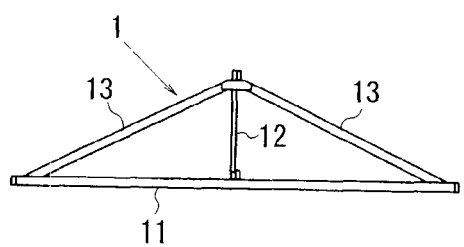
FIG. 4 is a diagram showing the construction of the structure.

As shown in FIGS. 1 and 4, the main beam 12 is placed vertically on the frame 11 arranged horizontally and is formed in three dimensions in an inverted T shape with the frame 11. The principal rafter 13 has, at both ends of the main beam 12, one end coupled to the main beam 12 and the other end coupled to the frame 11 to support the main beam 12.

The thus-built structure 1 can be built as a single structure independently of the support part of the greenhouse. The frame 11, the main beam 12, the principal rafter 13, or members constructing these need not be carried to the top of pillars erected on foundations to be built. The structure 1 can be built on the ground or at a place such as a factory, not a constructing site.

The end beams 11a and 11b, the string beams 11c and 11d, and the intermediate beams 11e and 11f constructing the frame 11, the chords 12a and 12b, the end vertical members 12c and 12d, the vertical members 12e, the diagonal members 12f constructing the main beam 12, and the principal rafter 13 can be constructed of steels (for instance, lipped channel steels) of the same shape and size in cross section. Designing these members in modules can be easily realized.

The steels constructing the frame 11, the main beam 12, and the principal rafter 13 can be all coupled with screws. The steels need not be welded in building the structure 1. The greatest advantage is that the building accuracy lowered due to weld distortion can be prevented. Satisfactory accuracy of the structure 1, the greenhouse roof frame and the greenhouse framework, which use the structure 1 can be realized.

A greenhouse framework building method using the structure 1 according to this embodiment will be described.

The structure 1 is built as follows. Members (steels) constructing the frame 11, the main beam 12, and the principal rafter 13 are cut in a predetermined length at a factory, and are then formed with hole parts used for screwing the coupling parts thereof to be carried to a constructing site. At the constructing site, these steels are used to build the frame 11 and the main beam 12 with screws. The main beam 12 is arranged on the frame 11 and the principal rafter 13 is arranged at both sides of the main beam 12. These are coupled with screws to build the structure 1. At the constructing site, the steels need not be welded and the length of the steels need not be adjusted. The structure 1 can be built only by coupling the steels with bolts. With the carrying conditions satisfied, the frame 11 and the main beam 12 built at the factory can be carried to the constructing site.

Figure 5:
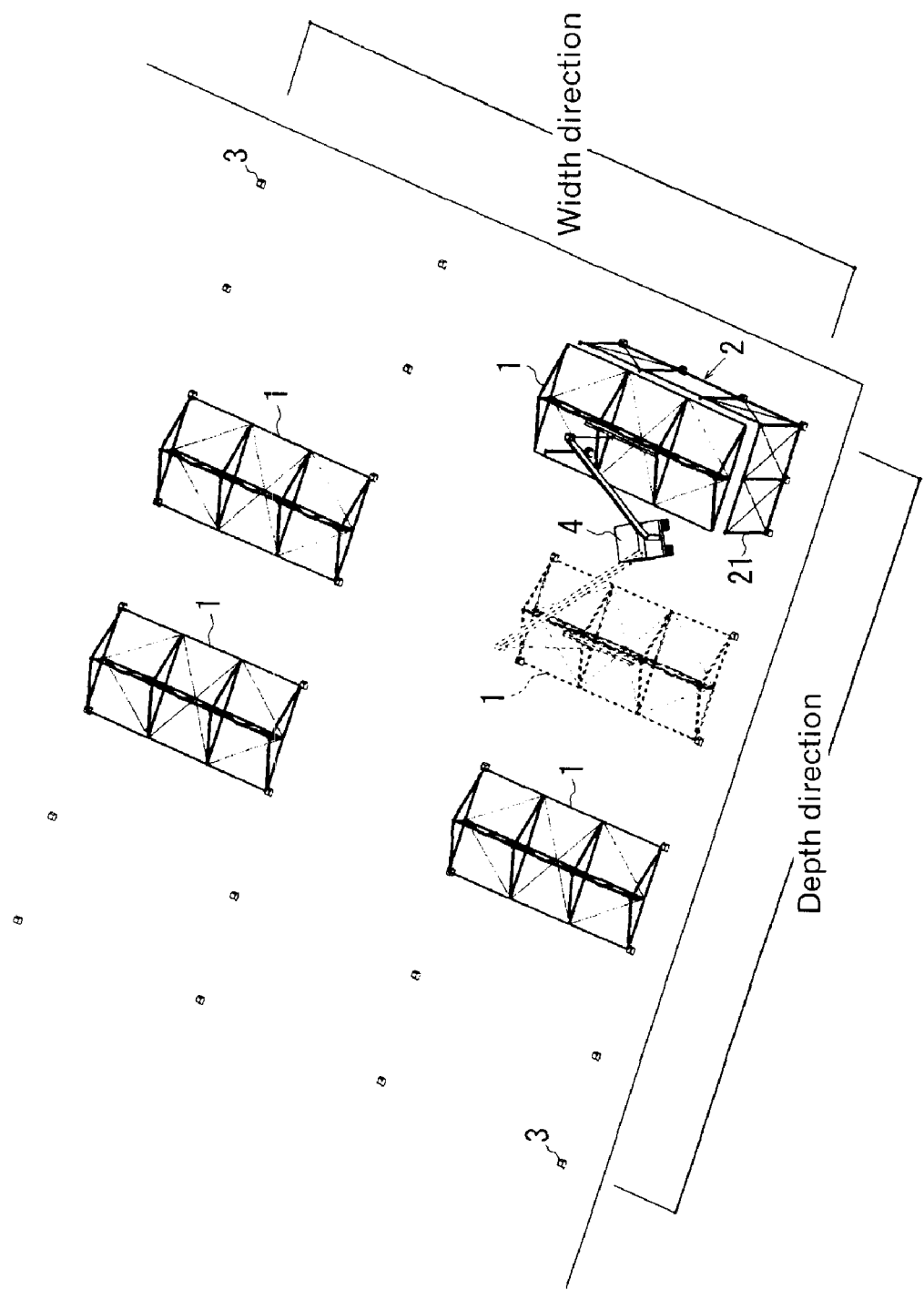
FIG. 5 is a diagram of assistance in explaining a greenhouse framework building method using the structures.

As shown in FIG. 5, the building operation of the structure 1 can be performed on the ground. As described above, the structure 1 can be singly built without requiring pillars 21 constructing a support part 2 of a greenhouse. The structure 1 need not be built at a high place and can be built on the ground. Accordingly, the structure 1 can be built on the ground much more efficiently than at a high place.

Figure 6:
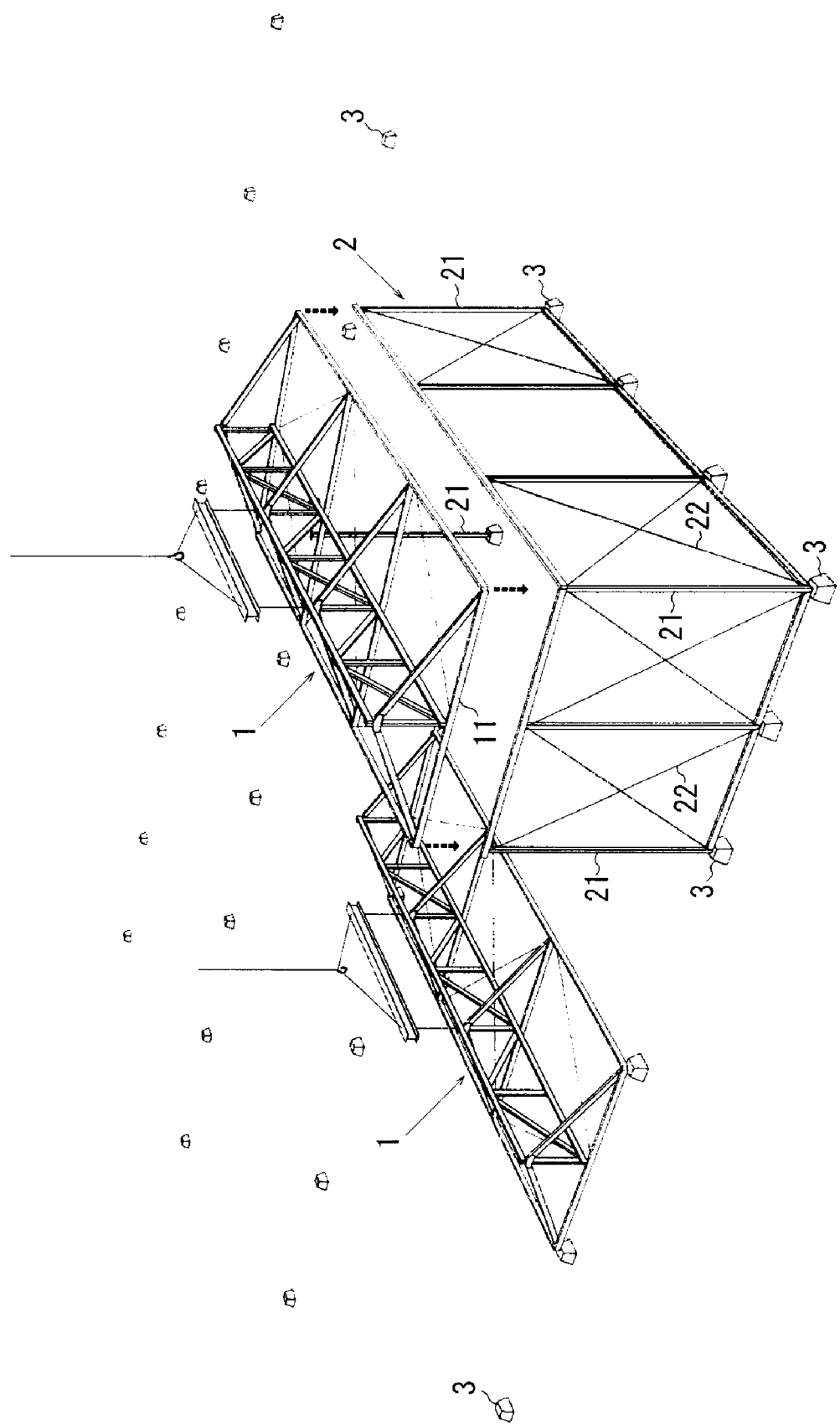
FIG. 6 is a diagram showing a setting method of the structure on a support part.
Figure 7:
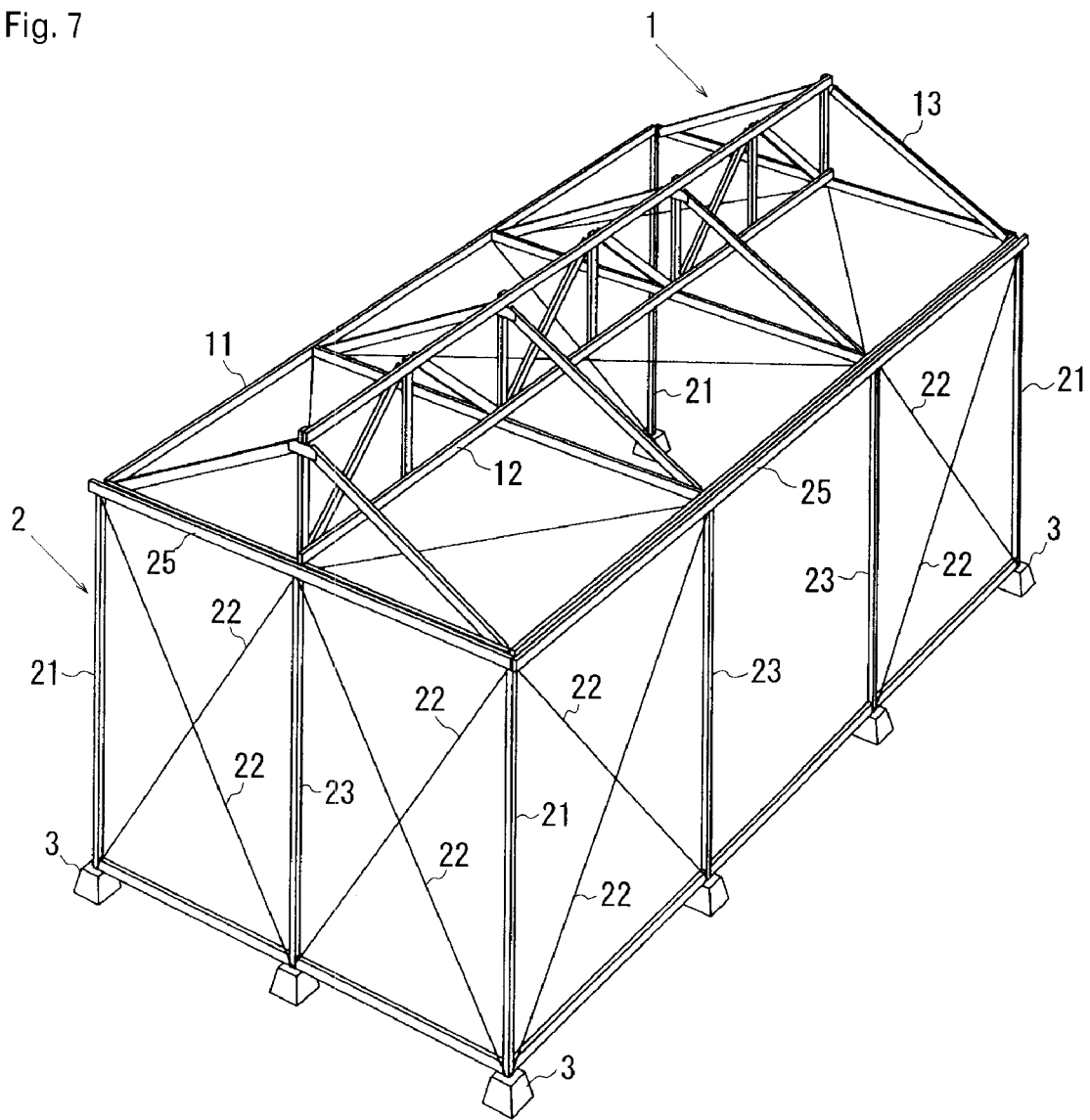
FIG. 7 is a diagram showing the state where the structure is set on the support part.
Figure 9:
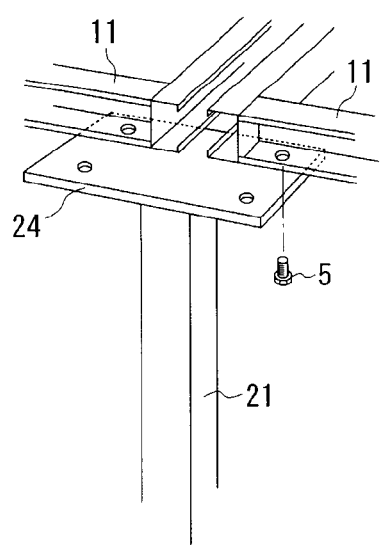
FIG. 9 is a diagram showing a joining method of the structures to the pillar.

The built structure 1 is carried on the top of the pillars 21 erected on foundations 3 using a crane 4 and as shown in FIG. 6, is set on the support part 2 in such a manner that four corners of the frame 11 are pinned to the pillars 21 using bolts 5 (see FIGS. 7 and 9). Each of the members constructing the structure 1 is not lifted and the structure 1 built on the ground is lifted. One lift is enough. The number of lifts of plural structures 1 can be much smaller than that of each of the members.

The structure 1 is set so that the chord 12a on the top of the main beam 12 is arranged in parallel with the width direction of the greenhouse (see FIG. 5). With this configuration, in the greenhouse using such structure 1, a ridge is orthogonal to the depth direction of the greenhouse.

Figure 8:
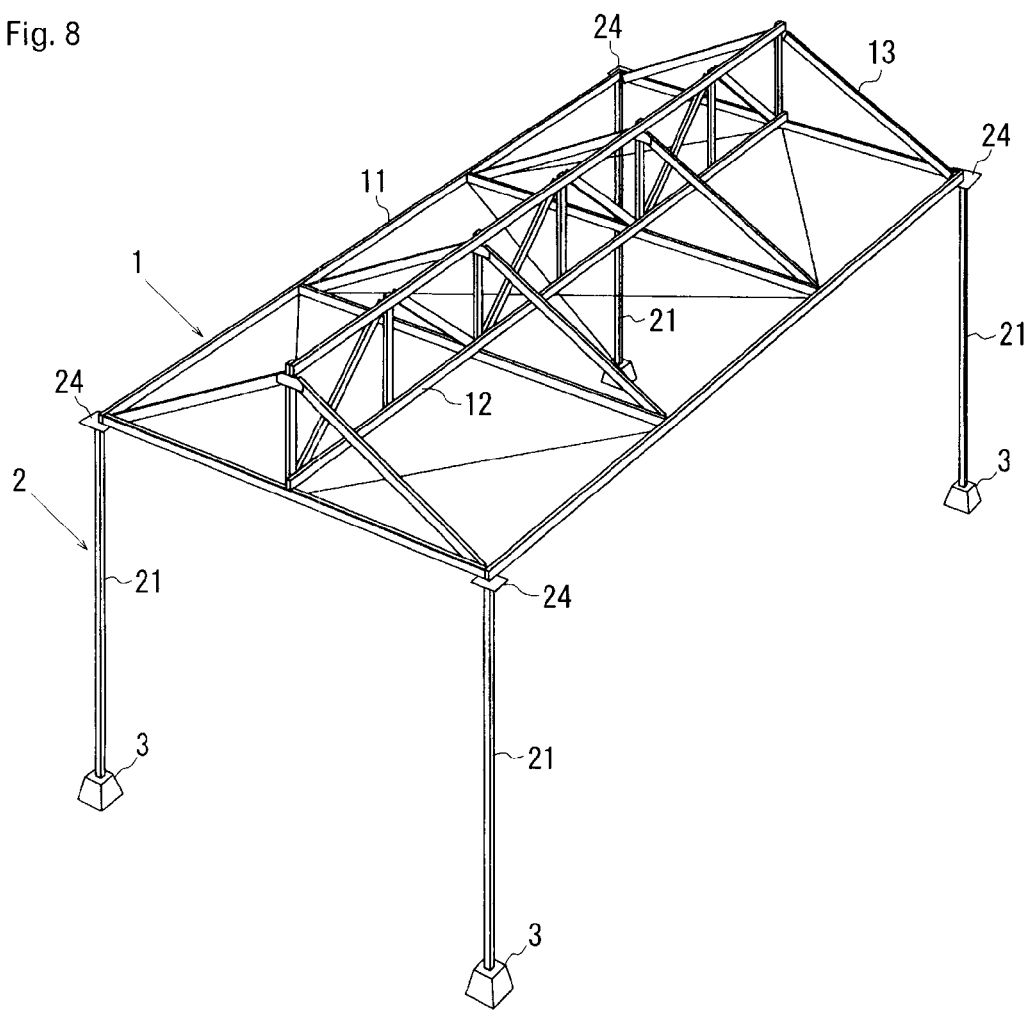
FIG. 8 is a diagram showing the state where the structure is set on pillars erected in a greenhouse.

The support part 2 refers to a part supporting the roof of the greenhouse and has the pillars 21 and braces 22 provided between the pillars 21. The construction of the support part 2 shown in FIG. 7 shows an example of the construction of the support part 2 in which the structure 1 is set first. Studs 23 are disposed between the pillars 21 erected in the positions corresponding to four corners of the frame 11 constructing the structure 1. The studs 23 do not directly support the structure 1 and are provided for disposing the braces 22 between the pillars 21. The studs 23 and the braces 22 provided to the support part 2 may be disposed only between the pillars 21 in the outer periphery part (gable surface and side surface) of the greenhouse. As shown in FIG. 8, they need not be disposed between the pillars 21 in the greenhouse. As described later, the pillars 21 erected in the greenhouse are coupled by the structure 1 and the braces 22 need not be disposed.

The pillars 21, the studs 23, and later-described tie rods 25 can be made of steels (for instance, lipped channel steels) of the same shape and size in cross section. The steels common to the frame 11, the main beam 12, and the principal rafter 13 of the structure 1 can be used as the pillars 21. Designing the members constructing the greenhouse framework in modules can be easily realized.

Plural structures 1 are prepared and are set on the pillar 21 erected on the foundation 3 to be adjacent to each other. This builds the roof frame on the support part 2.

Figure 10:
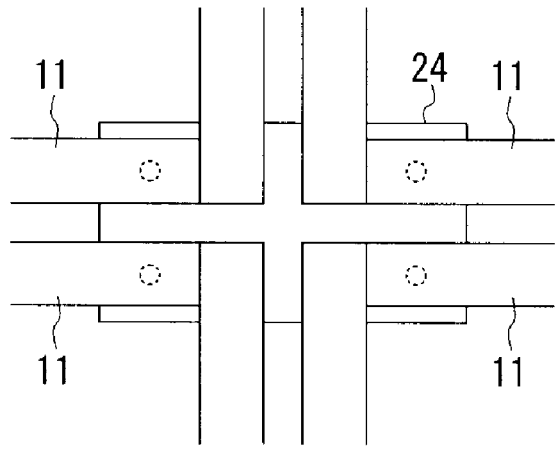
FIG. 10 is a plan view showing a joining method of the structures to the pillar.

As shown in FIGS. 9 and 10, each of the structures 1 adjacent to each other is preferably set on the support part 2 in such a manner that corner portions of the frames 11 constructing the structures 1 are gathered on a plate 24 provided on the top of the pillar 21 to be pinned. This integrates the structures 1 via the plate 24. A structural surface having a bearing strength against a horizontal load can be formed on the pillar 21. The pillars 21 erected in the greenhouse are joined to the structural surface. The bearing capacity can be exhibited to the horizontal load without providing the braces 22 (vertical braces) between the pillars 21 adjacent to each other in the width direction or in the depth direction. It is possible to easily realize arrangement of the structural surface having the vertical braces 22 transmitting the horizontal load to the foundations 3 in the outer periphery part (gable surface and side surface) not interfering with the use of the greenhouse.

The pillars 21 are coupled by the frames 11 of the structures 1. The braces (horizontal braces) diagonally connecting the pillars 21 need not be provided. Unlike the prior art, the plumbing adjustment operation using the vertical braces and the horizontal braces can be unnecessary.

Any distortion caused when a roof frame is built on the support part has been corrected using the vertical braces and the horizontal braces. Adjustment of the horizontal braces needs adjustment of the vertical braces. The plumbing adjustment operation has required considerable effort and a high technique. According to the framework building method, the top of the pillar 21 is joined to the frames 11 of the structures 1 integrated via the plate 24. The roof frame can be built on the support part 2 without causing any distortion. Therefore, the horizontal braces need not be provided and the plumbing operation is unnecessary.

The construction in which corner portions of plural frames 11 are gathered on one pillar 21 via the plate 24 to be pinned is employed. The number of the pillars 21 can be minimum. The pillars 21 erected in the greenhouse are coupled by the structures 1. The strength can be held without providing the braces 22 between the pillars 21. As the result, the number of members (the pillars 21 and the braces 22) of the support part 2 can be reduced.

The structures 1 are set on the support part 2 at a high place. The corner portion of the frame 11 may be fixed onto the plate 24 with one bolt. The number of joints of the roof frame and the support part 2 is reduced greatly. The setting operation at a high place can be performed easily and quickly. This building method can build the roof frame on the support part 2 in such a manner that a hole part formed in the frame 11 constructing the structure 1 is matched and communicated with a hole part formed in the plate 24 provided on the top of the pillar 21 and a bolt 5 is then inserted into both hole parts to be fixed. A high technique is not required for the operator and an operation at a high place can be less dangerous.

Figure 11:
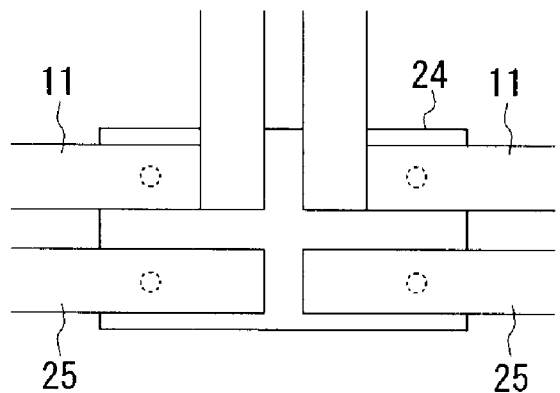
FIG. 11 is a plan view showing a joining method of tie rods to the pillar.

In FIG. 7, the numeral 25 denotes a tie rod. This is bridged between the pillars 21 when the support part 2 is built and supports the pillars 21 not to fall. As shown in FIG. 11, the end of the tie rod 25 is fixed onto the plate 24 provided on the top of the pillar 21.

Figure 12:
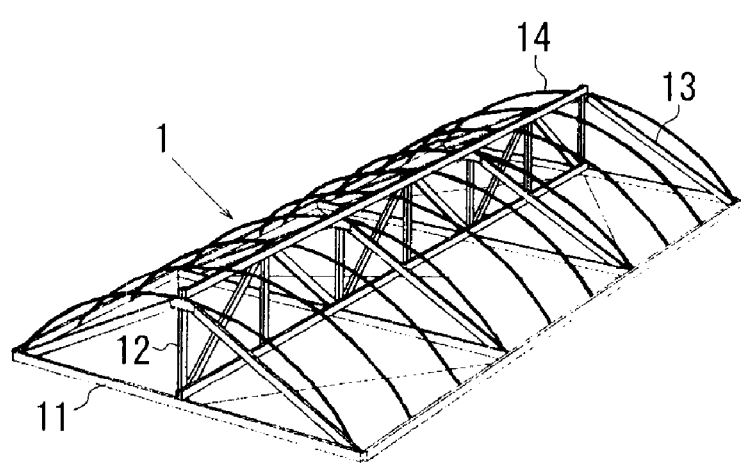
FIG. 12 is a perspective view showing the structure according to another embodiment of the invention.

The structure 1 may have a secondary member such as a covering material (for instance, plastic film, glass, or plate material made of a resin) of a greenhouse and a supporting member supporting the covering material (for instance, arch pipe or frame). Typical examples of such secondary member include a covering material, a supporting member of the covering material, a roof skylight, and a gutter. Such secondary member thus can be built on the ground, which is very efficient as compared with building at a high place and the operation itself is easy. The structure 1 having the secondary member is built on the ground to be carried on the pillars 21. The lifting workload can be reduced greatly. FIG. 12 shows an example of the structure 1 having a supporting member 14 as the secondary member (arch pipe supporting a plastic film used as a covering material).

As described above, the thus-built greenhouse framework can greatly reduce the lifting workload and the building workload at a high place as compared with those of the prior art greenhouse framework.

Such greenhouse framework can transmit a vertical load acting on the roof of the greenhouse from the covering material of the roof via the support member of the coating material to the frame 11 and the main beam 12 supporting the supporting member. A vertical load acting on the frame 11 is transmitted via the principal rafter 13 to the main beam 12, and is then gathered to the principal rafter 13 at both ends of the main beam 12 to be transmitted via the end beams 11a and 11b of the frame 11 to the pillars 12 and the foundations 3. A horizontal force acting on the roof surface due to a wind or earthquake is transmitted from the main beam 12 to the frame 11 or is directly transmitted to the frame 11. A horizontal force acting on the wall surface is transmitted to the frame 11 in the outer periphery part of the greenhouse via plural adjacent frames 11 and the braces 22 provided in the outer periphery part of the greenhouse or between the pillars 21 in the depth direction to the foundations 3. The greenhouse framework can obtain sufficient strength to an outer force such as an earthquake force or wind pressure force without being rigidly joined.

According to such greenhouse framework, the main beam 12 constructing the structure 1 can hold the same strength to an outer force acting on the greenhouse as that of a girder provided between the pillars in the width direction as the prior art greenhouse framework. No girders need be provided to the support part 2. Time and effort for setting any girder can be eliminated and the cost can be reduced.

The rectangular main beam 12 arranged vertically on the frame 11 can increase the depth of girder and the load ability to the vertical load can be increased.

According to such greenhouse framework, the main beam 12 disposed to be orthogonal to the depth direction of the greenhouse is arranged vertically on the frame 11 whose four corners are supported by the pillars 21. The space between the pillars 21 erected in the depth direction can be made larger than that of the prior art greenhouse framework.

INDUSTRIAL APPLICABILITY

The structure 1 of the present invention can be built on the ground and can be pinned to the support part 2. Therefore, the greenhouse roof frame, the framework of the entire greenhouse, and the greenhouse are built using the structure. Sufficient strength to an outer force acting on the greenhouse can be held. The lifting workload and the building workload can be greatly reduced as compared with those of the prior art. The structure 1 is suitable for a large greenhouse having a large cultivation area.

The invention claimed is:

1. A structure used as a roof frame of a greenhouse comprising
    a rectangular frame arranged horizontally,
    a rectangular main beam arranged vertically on the rectangular frame, and
    a principal rafter supporting the rectangular main beam, and
    pillars which support the rectangular frame, the pillars having top edges,
    wherein the rectangular frame is coupled to the top edges of the pillars;
    wherein the rectangular main beam comprises upper and lower chords arranged in parallel at the upper and lower sides, and end vertical members provided between both ends of the chords;
    wherein the rectangular frame and the rectangular main beam are disposed in an inverted T shape; and
    wherein one end of the principal rafter is coupled to the upper chord of the rectangular main beam and the other end of the principal rafter is coupled to the rectangular frame at both sides of the rectangular main beam.

2. The structure according to claim 1, wherein the structure is set on a support part of the greenhouse including the pillars in such a manner that four corners of the rectangular frame are pinned to the top edges of the pillars, respectively.

3. The structure according to claim 1, further comprising a secondary member such as a covering material of the greenhouse and a supporting member of the covering material.

4. A roof frame of a greenhouse comprising plural structures which are set on a support part of the greenhouse including pillars to be adjacent to each other,
    wherein each of the structures comprises
        a rectangular frame arranged horizontally,
        a rectangular main beam arranged vertically on the rectangular frame, and
        a principal rafter supporting the rectangular main beam;
    wherein the rectangular frame is coupled to the top edges of the pillars;
    wherein the rectangular main beam comprises chords arranged in parallel at the upper and lower sides, and end vertical members provided between both ends of the chords;
    wherein the rectangular frame and the rectangular main beam are disposed in an inverted T shape; and
    wherein one end of the principal rafter is coupled to the upper chord of the rectangular main beam and the other end of the principal rafter is coupled to the rectangular frame at both sides of the rectangular main beam.

5. The roof frame according to claim 4, wherein each of the structures is set on the support part in such a manner that four corners of the rectangular frame are pinned to the top edges of the pillars, respectively.

6. The roof frame according to claim 5, wherein the structures adjacent to each other are set on the support part in such a manner that corner portions of the rectangular frames are gathered on a plate provided on the top edges of the pillars to be pinned.

7. A greenhouse framework comprising pillars constructing a support part of a greenhouse, and plural structures which are set on the top edges of the pillars to be adjacent to each other,
    wherein each of the structures comprises
        a rectangular frame arranged horizontally,
        a rectangular main beam arranged vertically on the rectangular frame, and
        a principal rafter supporting the rectangular main beam;
    wherein the rectangular frame is coupled to the top edges of the pillars;
    wherein the rectangular main beam comprises chords arranged in parallel at the upper and lower sides, and end vertical members provided between both ends of the chords;
    wherein the rectangular frame and the rectangular main beam are disposed in an inverted T shape; and
    wherein one end of the principal rafter is coupled to the upper chord of the rectangular main beam and the other end of the principal rafter is coupled to the rectangular frame at both sides of the rectangular main beam.

8. The greenhouse framework according to claim 7, wherein each of the structures is set on the support part in such a manner that four corners of the rectangular frame are pinned to the top edges of the pillars, respectively.

9. The greenhouse framework according to claim 8, wherein the structures adjacent to each other are set on the support part in such a manner that corner portions of the rectangular frames are gathered on a plate provided on the top edges of the pillars to be pinned.

10. A greenhouse comprising a roof having a roof frame, and a support part supporting the roof frame,
    wherein the roof frame comprises plural structures which are set on the support part to be adjacent to each other,
    wherein each of the structures comprises
        a rectangular frame arranged horizontally,
        a rectangular main beam arranged vertically on the rectangular frame, and
        a principal rafter supporting the rectangular main beam;
    wherein the rectangular frame is coupled to the top edges of pillars constructing the support part;
    wherein the rectangular main beam comprises chords arranged in parallel at the upper and lower sides, and end vertical members provided between both ends of the chords;
    wherein the rectangular frame and the rectangular main beam are disposed in an inverted T shape; and
    wherein one end of the principal rafter is coupled to the upper chord of the rectangular main beam and the other end of the principal rafter is coupled to the rectangular frame at both sides of the rectangular main beam.

11. The greenhouse according to claim 10, wherein each of the structures is set on the support part in such a manner that four corners of the rectangular frame are pinned to the top edges of the pillars, respectively.

12. The greenhouse according to claim 11, wherein the structures adjacent each other are set on the support part in such a manner that corner portions of the rectangular frames are gathered on a plate provided on the top edges of the pillars to be pinned.

13. A method of building a greenhouse framework comprising the steps of:
   a) building plural structures; and
   b) setting the structures built by said a) step on the top edges of pillars constructing a support part of a greenhouse to be adjacent to each other,
   wherein each of the structures comprises
      a rectangular frame arranged horizontally,
      a rectangular main beam arranged vertically on the rectangular frame, and
      a principal rafter supporting the rectangular main beam;
   c) coupling the rectangular frame to the top edges of the pillars;
   wherein the rectangular main beam comprises chords arranged in parallel at the upper and lower sides, and end vertical members provided between both ends of the chords;
   wherein the rectangular frame and the rectangular main beam are disposed in an inverted T shape; and
   wherein one end of the principal rafter is coupled to the upper chord of the rectangular main beam and the other end of the principal rafter is coupled to the rectangular frame at both sides of the rectangular main beam.

14. The greenhouse framework building method according to claim 13, wherein in said b) step, each of the structures is set on the support part in such a manner that four corners of the rectangular frame are pinned to the top edges of the pillars, respectively.

15. The greenhouse framework building method according to claim 14, wherein in said b) step, the structures adjacent each other are set on the support part in such a manner that corner portions of the rectangular frames are gathered on a plate provided on the top edges of the pillars to be pinned.

16. The greenhouse framework building method according to claim 13, wherein each of the structures built by said a) step further comprises a secondary member such as a covering material of the greenhouse and a supporting member of the covering material.

* * * * *